Dec. 6, 1960  F. C. PETERSON ET AL  2,963,155
MEANS FOR MINERAL CLASSIFICATION AND SEPARATION
Filed Dec. 31, 1954
FIG_1
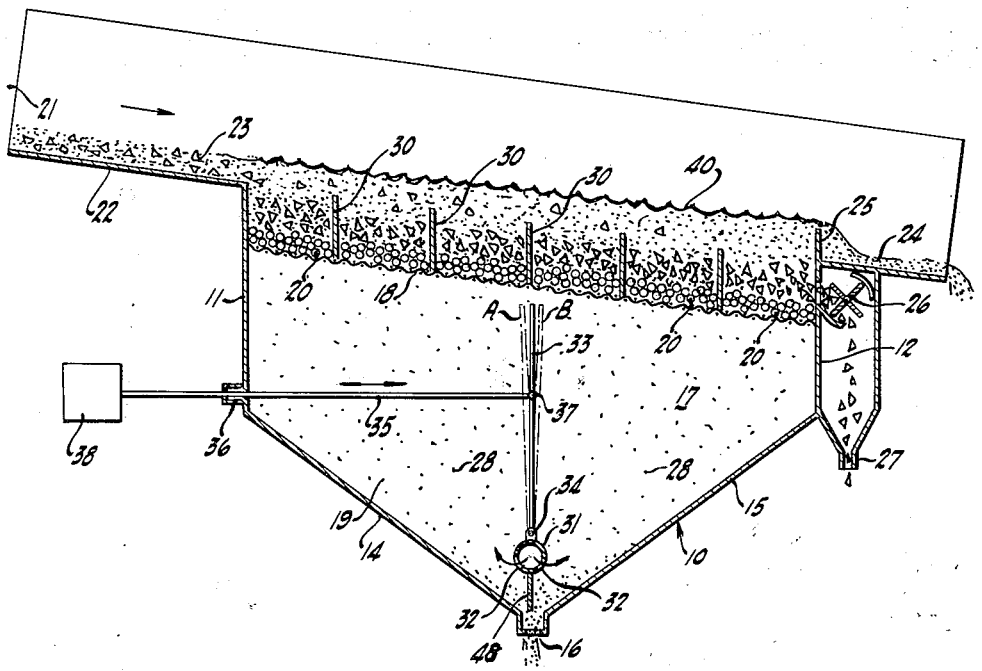
FIG_2
INVENTOR.
NORRIS GOODWIN
FRANK C. PETERSON
ATTORNEY United States Patent Office 2,963,155
Patented Dec. 6, 1960

2,963,155

MEANS FOR MINERAL CLASSIFICATION AND SEPARATION

Frank C. Peterson, P.O. Box 620, Oroville, Calif., and Norris Goodwin, Carlton Hotel, 1075 Sutter St., San Francisco, Calif., assignors to said Peterson, said Goodwin and G. G. Sanders, San Francisco, Calif., as trustees, jointly Filed Dec. 31, 1954, Ser. No. 479,014

3 Claims. (Cl. 209—457)

This invention relates to improvements in both the apparatus and method for concentrating and separating minerals, and particularly relates to the practice thereof in apparatus generally known in the art as jigs.

The use of jigs for the separation of minerals of different specific gravity, of course, is old and well-established. Jig classification and separation is, in general, based upon the principle of alternately dilating and contracting or sucking a bed of heavy mineral or metal particles which overlay a screen, while either holding or flowing a suspension of minerals to be separated over the top of the bed. Various means have been devised for alternately dilating and contracting the jig bed, but they resolve themselves to passing a slow current of water, known as hutch water, upwardly through the bed to bring about dilation and returning the water to the hutch to cause the contraction or sucking.

Among the devices and methods used to bring about the dilation and contraction of the bed through pulsations or surges, are pistons, diaphragms, paddles or any other type of device which will act upon the hutch water to bring about this result. Air has also been used to bring about the pulsations, but principally water is used for this purpose. The pulsations keep the heavy particles in the lower section of the bed, "live" and free from packing. The alternate dilations and contractions with such a free bed brings about a sorting and classification according to specific gravity, as is presently well understood.

It has been the general jig practice, whether in continuous or in batch operation, to give a uniform pulsation and alternate contractings over the entire jig bed surface. In other words, in any one instance the entire jig bed is either being dilated or raised or, on the contrary, is being contracted or sucked down to the screen itself.

It is an object of the present invention to provide a device which has a new, novel and much more effective action than has heretofore been obtained in jigging operations.

It is a further object of the present invention to provide a method of establishing interfering pulsations to produce maximum turbulence in the jig bed and feed for accomplishing mineral classification and separation.

It is likewise another object of the present invention to provide a mechanism for establishing interfering waves in a horizontal plane to produce substantially vertical standing waves which act upon the bed and the feed of minerals in suspension.

Another object of the invention is to provide a means for establishing a high frequency and amplitude of motion in the hutch water in a substantially horizontal direction, which is reflected from the end walls of the hutch, causing interference and developing substantially vertical standing waves, which provide maximum turbulence on the bed surface.

Further objects are to provide a construction of maximum simplicity, economy, and ease of assembly and disassembly. Also such further objects, advantages and capabilities as will fully appear and as are inherently possessed by the device and the invention described herein.

The invention further resides in the combination, construction and arrangement of parts illustrated in the accompanying drawings, and while there is shown therein a preferred embodiment thereof, it is to be understood that the same is merely illustrative of the invention and that the invention is capable of modification and change and comprehends other details of construction without departing from the spirit thereof or the scope of the appended claims.

Referring to the drawings:

Figure 1 is a schematic section showing a preferred form of apparatus in which the method of the present invention may be accomplished.

Figure 2 is a diagrammatic showing of a generated horizontal wave in the hutch water in full line and the reflected wave in broken line, giving rise to vertical standing waves.

Referring now more particularly to the drawings, Figure 1 represents a vertical section of a form of jig capable of accomplishing the steps of the method disclosed. It will be observed that the jig apparatus involves a usual hutch construction 10, having vertical end walls 11 and 12 which join a sloping bottom 14 and 15, respectively, leading to a central outlet 16. The side walls are preferably vertical and only the far side wall 17 can be observed in this view. Adjacent the top edge of the hutch 10 is the conventional screen 18 which is shown at an angle downwardly in Figure 1, but it is to be understood that the same may also be placed substantially in a horizontal plane. However, it is observed that better results are obtained if placed at a downward angle in the direction of flow, and, therefore, this is shown as the preferable position. The heavy mineral or metal particles resting on the screen are shown in the form of metal balls 20. The inlet is shown at 21 as a sluice, the bottom 22 of which is located above the plane of the screen 20. The feed of a suspension of minerals to be separated is indicated at 23. The separated lightest fraction is taken off at 24 over the weir 25, while the large heavy fraction is taken off above the bed of balls 20 by the star wheel 26 and are recovered separately at 27. The heaviest small fractions sift through the balls 20 into the chamber 19 of the hutch 10 and as they settle are collected at the outlet 16.

As shown in Figure 1 transverse weirs or baffles 30 may be placed above the screen 18 transversely to the flow. While such baffles are not essential to the operation, nevertheless applicants have observed preferable results as evidenced by better action and sharper separation where such baffles have been used in this particular method and operation.

Hutch water is introduced into the hutch chamber 19 through the pipe 31, having outlets on the underside thereof as at 32 in order not to become clogged or interfere with the settling of the heavy fine material 28. The pipe 31 is located adjacent the apex in the bottom of the hutch 10. A vertical plate or paddle 33 is pivotally mounted as at 34 along the top of the inlet pipe 31, or it may be pivotally mounted to the side walls 17 in this same location. A rod 35, which passes through a water-proof gland 36 in the end wall 11 is attached at its inner end to the plate 33 as at 37. The other end of the rod 35 is attached to any mechanism which will accomplish rapid reciprocating motion which is generally represented by the numeral 38 and may consist of, for example, an eccentric collar attached to a variable stroke eccentric which is turned by the shaft of an electric motor or the like. None of this is shown as this is completely conventional and there are several well-known means to accomplish this motion.

The hinged wall or paddle 33 is adapted to be moved in a very small arc and preferably the complete arc from position A to position B is not more than a total of five degrees. Also, the means 38 for accomplishing the reciprocating movement of the rod 35 is such that it may be adjusted to a frequency of from 800 cycles to 1,600 cycles per minute.

The operation of the device is as follows: The feed, which is in a liquid with minerals in suspension, comes in at the entrance 21 and is immediately delivered to the bed of metal balls 20 on top of the screen 18. The hutch chamber 19 has been previously supplied with water so that all of the under surface of the screen 18 is in contact with the hutch water.

As soon as the suspension of minerals to be separated reaches the hutch, it comes under the influence of the action of the hutch water from the inlet to the outlet over weirs 25. The action of the hutch water is set up by reciprocating the rod 35, causing the hinged wall or paddle 33 to move in a very small arc from A to B, preferably not more than a five degree (5°) movement in total. The frequency of the cycle is preferably from 800 cycles to 1,600 cycles per minute. As will be observed, this is very short and rapid, and since the movement of the wall or paddle 33 is within a very slight angularity, the movement transmitted to the water is in the form of a series of lateral or substantially horizontal waves. In the position A or moving to the position A, the waves are directed toward the wall 11, while in position B or moving to position B, the waves are directed to wall 12. Both of these walls being substantially at right angles to the direction of these waves and being unyielding, the waves are reflected back upon themselves. This is diagrammatically shown in Figure 2. The waves directed outwardly from the paddle are represented by the solid line, while the waves by reflection backward are represented by the broken line. As the result of the rapid movement of these waves laterally, both going and returning, standing waves are developed much in the same manner as the standing sound waves are established in the well-known Kundt experiments. These standing waves produce a substantially vertical pressure upwardly in a myriad of places.

The existence of wave interference patterns in the liquid below the jig bed resulting in standing waves bringing about localized pressure differences, are apparent on the surface 40 of the liquid flow. The large number of oppositely directed vertical waves gives the entire surface a dancing motion which is entirely up and down, or substantially vertical with respect to the horizontal. Thus, the maximum turbulence over the entire area is continuously maintained. These surface motions can only represent and result from what is happening in the bed below, and to a large extent explains the exceptional results which are achieved.

The exceptionally rapid and sharp separations which are obtained, result from the apparent fact that at any one instance, only one small portion of the bed is being subject to a dilation or upward force while another adjacent small portion is being subjected to a force in the opposite direction. This is repeated many times over the entire area of the bed and the result is a steady and constant turbulence which maintains the bed in a steady live condition, as contrasted with a bed which is wholly alternately dilated and contracted over its entire surface.

It will be observed that the maximum turbulence is therefore obtained at all times over the entire area. There is no direct pulsation of any kind to the bed 20, itself. On the contrary, the force which acts upon the bed is the resultant of a lateral pulse or wave and return interference which is represented physically by a vertical standing wave.

It is further to be noted that the frequency and the amplitude of the motion of the paddle or wall 33 must be such as to establish a true wave pulsation rather than a slow surge. The pulsations must be substantially in a horizontal plane and provision must be made for the reflection of the primary wave or pulsation back upon itself in order to set up the appropriate interference.

The presence of the baffles 30 along the progress of the flow insures sufficient residence of the material in suspension to obtain the full action of the jig. It has been observed that no material decrease in flow is encountered when the transverse walls or weirs 30 are used, but that there is a better and more thorough separation than without them.

As appears in Figure 1, a transverse baffle 48 may be added within the hutch to depend from the hutch water inlet. The baffle 48 preferably extends downwardly adjacent the apex outlet 16. This baffle tends to minimize any turbulence caused by the incoming hutch water and so facilitate the settling and withdrawing of the heavy particles.

We claim:

1. A jigging apparatus comprising in combination a hutch having vertical side walls and end walls vertical adjacent the top portion and sloping to form a hopper bottom, an outlet at the apex of said hopper bottom, a screen in said hutch covering the entire area thereof located adjacent the top thereof, a feed inlet at the top of one of said hutch end walls and outlets at the other end wall, a transverse paddle hingedly mounted within said hutch in the bottom thereof adjacent the outlet at said apex, a liquid inlet at the bottom of said hutch, and means for rapidly moving said paddle in a small arc of the order of 5°, said movement being at a maximum just below said screen.

2. A jigging apparatus comprising in combination a hutch having vertical side walls and end walls vertical adjacent the top portion and sloping to form a hopper bottom, an outlet at the apex of said hopper bottom, a screen in said hutch covering the entire area thereof located adjacent the top thereof, transverse vertical baffles in said hutch above said screen, a feed inlet at the top of one of said hutch end walls and outlets at the other end wall comprising a weir and a star gate, a transverse paddle hingedly mounted within said hutch adjacent the outlet at said apex extending upwardly to a point just below said screen, a transverse liquid inlet adjacent the outlet at said apex and to which said paddle is hinged, a transverse baffle depending from said liquid inlet and extending to the mouth of said apex outlet, and means for rapidly moving said paddle in a small arc of the order of 5°.

3. A jigging apparatus comprising in combination a hutch having vertical side walls and end walls vertical adjacent the top portion and sloping to form a hopper bottom, an outlet at the apex of said hopper bottom, a screen in said hutch covering the entire area thereof located adjacent the top thereof and sloped downwardly from feed inlet to outlet, transverse vertical baffles in said hutch above said screen, a feed inlet at the top of one of said hutch end walls and outlets at the other end wall comprising a weir and a star gate, a transverse paddle hingedly mounted within said hutch adjacent the outlet at said apex extending upwardly to a point just below said screen, a transverse liquid inlet adjacent the outlet at said apex and to which said paddle is hinged, a transverse baffle depending from said liquid inlet and extending to the mouth of said apex outlet, and means for rapidly moving said paddle in a small arc of the order of 5°.

References Cited in the file of this patent

UNITED STATES PATENTS

| | | |
|---|---|---|
| 906,239 | Knoyes | Dec. 8, 1908 |
| 963,519 | Cory | July 5, 1910 |
| 1,378,521 | Brinley | May 17, 1921 |
| 1,530,889 | Hachita | Mar. 24, 1925 |
| 2,246,084 | Wood | June 17, 1941 |
| 2,416,450 | Macaulay | Feb. 25, 1947 |

FOREIGN PATENTS

| | | |
|---|---|---|
| 447,290 | France | Dec. 28, 1912 |

OTHER REFERENCES

Coal Age, July 1933, pp. 235, 236.